(12) United States Patent
Hao et al.

(10) Patent No.: US 12,540,980 B2
(45) Date of Patent: Feb. 3, 2026

(54) METHOD AND DEVICE FOR ESTIMATING BATTERY STATE OF CHARGE BASED ON ELECTROCHEMICAL MODEL

(71) Applicant: SHANGHAI MAKESENS ENERGY STORAGE TECHNOLOGY CO., LTD., Shanghai (CN)

(72) Inventors: Pingchao Hao, Shanghai (CN); Danfei Gu, Shanghai (CN); Xiao Yan, Shanghai (CN); Enhai Zhao, Shanghai (CN); Pei Song, Shanghai (CN); Peng Ding, Shanghai (CN); Weikun Wu, Shanghai (CN); Xiaohua Chen, Shanghai (CN)

(73) Assignee: SHANGHAI MAKESENS ENERGY STORAGE TECHNOLOGY CO., LTD., Shanghai (CN)

( * ) Notice: Subject to any disclaimer, the term of this patent is extended or adjusted under 35 U.S.C. 154(b) by 404 days.

(21) Appl. No.: 18/115,130

(22) Filed: Feb. 28, 2023

(65) Prior Publication Data
US 2023/0280404 A1    Sep. 7, 2023

(30) Foreign Application Priority Data

Mar. 1, 2022    (CN) .......................... 202210196315.2

(51) Int. Cl.
*G01R 31/367* (2019.01)
*G01R 31/3842* (2019.01)
*H02J 7/00* (2006.01)

(52) U.S. Cl.
CPC ....... *G01R 31/367* (2019.01); *G01R 31/3842* (2019.01); *H02J 7/0048* (2020.01)

(58) Field of Classification Search
CPC .. G01R 31/367; G01R 31/3842; H02J 7/0048
See application file for complete search history.

(56) References Cited

U.S. PATENT DOCUMENTS

| | | | | |
|---|---|---|---|---|
| 2018/0198300 | A1* | 7/2018 | Howey | H01M 10/045 |
| 2020/0088797 | A1* | 3/2020 | Takahashi | G01R 31/385 |
| 2022/0013813 | A1* | 1/2022 | Kim | H01M 10/486 |
| 2022/0200071 | A1* | 6/2022 | Ko | H01M 10/443 |
| 2023/0130896 | A1* | 4/2023 | Lee | H01M 10/486 |
| | | | | 320/152 |

* cited by examiner

*Primary Examiner* — Ricky Go
(74) *Attorney, Agent, or Firm* — troutman pepper locke; Tim Tingkang Xia, Esq.

(57) ABSTRACT

The invention provides method and device for battery state-of-charge (SOC) estimation. The method comprises establishing an electrochemical model for a battery; setting an initial value of the current SOC of the battery, and determining an initial distribution of solid-phase lithium ion concentrations in the electrochemical model according to the initial value of the SOC; performing a charge/discharge test on the battery, collecting measured voltage and current of the battery after a first time interval; calculating an output voltage and a distribution of the solid-phase lithium ion concentrations at a current acquisition time based on the measured current and the initial distribution of the solid-phase lithium ion concentrations; and when a voltage difference between the output voltage and the measured voltage is within a preset range, estimating the current SOC value of the battery based on the distribution of the solid-phase lithium ion concentration at the current acquisition time.

7 Claims, 8 Drawing Sheets

METHOD AND DEVICE FOR ESTIMATING BATTERY STATE OF CHARGE BASED ON ELECTROCHEMICAL MODEL

CROSS-REFERENCE TO RELATED PATENT APPLICATION

This application claims priority to and the benefit of Chinese Patent Application No. 202210196315.2, filed Mar. 1, 2022, which are incorporated herein in their entireties by reference.

FIELD OF THE INVENTION

The invention relates generally to the field battery managements, and more particularly to a method and a device for estimating state of charge of a battery based on an electrochemical model.

BACKGROUND OF THE INVENTION

A large number of lithium batteries are used in energy storage power stations. Estimation of state of charge (SOC) of a battery is an important function of a battery management system (BMS). Further, the SOC value is also an important parameter for the performance of energy storage power stations. Accurate estimation of the SOC can significantly improve the performance of the battery, and maximize the regulating role and economic value of the power station in frequency regulation energy storage and "peak shaving and valley filling".

Currently, the mainstream SOC estimation methods are based on macroscopic physical quantities such as current and voltage. The more commonly used methods are open circuit voltage methods and ampere-hour integration methods. Among them, the ampere-hour integration method is to integrate the charging or discharging current of the battery for a period of time, and add it to the initial electric quantity. The accuracy depends on the accuracy of the initial SOC. However, it is difficult to know the initial SOC of the battery under actual working conditions. SOC, which makes it less accurate. The open circuit voltage method is to measure the battery open circuit voltage (OCV) corresponding to each SOC value, and establish the mapping relationship between the OCV and SOC of the battery. However, when measuring the open circuit voltage, the battery needs to be disconnected from the external circuit by a certain period of time. Therefore, the OCV method is not applicable for real time online estimates.

Therefore, a heretofore unaddressed need exists in the art to address the aforementioned deficiencies and inadequacies.

SUMMARY OF THE INVENTION

In view of the aforementioned deficiencies and inadequacies in the prior art, one of the objectives of this invention is to provide a method and a device for estimating the state of charge (SOC) of a battery based on an electrochemical model, which solves the problem that the SOC estimation of the battery in the prior art depends on the accuracy of the initial value of the SOC.

In one aspect of the invention, the method includes building the electrochemical model for the battery; setting an initial value of the current SOC of the battery, and determining an initial distribution of solid-phase lithium ion concentrations in the electrochemical model according to the initial value of the SOC; performing a charge/discharge test on the battery, and after a first time interval, collecting a measured voltage and a measured current of the battery; calculating an output voltage and a distribution of the solid-phase lithium ion concentrations of the electrochemical model at a current acquisition time, based on the measured current and the initial distribution of the solid-phase lithium ion concentrations; and when a voltage difference between the output voltage and the measured voltage is within a preset range, calculating the average concentration of the solid-phase lithium ions of the electrochemical model based on the distribution of the solid-phase lithium ion concentrations at the current acquisition time, and calculating the current SOC value of the battery according to the average concentration.

In one embodiment, when the voltage difference between the output voltage and the measured voltage exceeds the preset range, adjusting the distribution of the solid-phase lithium ion concentrations at the current acquisition time based on the voltage difference between the output voltage and the measured voltage, and the relationship between the predicted positive/negative electrode open circuit potential (OCP) and the solid-phase surface lithium ion concentrations.

In one embodiment, the method further includes obtaining the measured voltage and the measured current of the battery at a next acquisition time; calculating the output voltage and the distribution of the solid-phase lithium ion concentrations of the electrochemical model at the next acquisition time according to the measured current at the next acquisition time and the adjusted distribution of the solid-phase lithium ion concentration; and when a voltage difference between the output voltage at the next acquisition time and the measured voltage at the next acquisition time is within the preset range, calculating the average concentration of the solid-phase lithium ions of the electrochemical model according to the distribution of the solid-phase lithium ion concentration at the next acquisition time, and calculating the current SOC value of the battery according to the average concentration.

In one embodiment, said adjusting the distribution of the solid-phase lithium ion concentrations at the current acquisition time based on the voltage difference between the output voltage and the measured voltage, and the relationship between the predicted positive/negative electrode open circuit potential (OCP) and the solid-phase surface lithium ion concentration comprises: selecting a positive electrode or a negative electrode as the first electrode; obtaining the surface lithium ion concentration of the first electrode of the electrochemical model at the current acquisition time, which is recorded as the first surface lithium ion concentration; obtaining the open circuit potential of the first electrode at the current acquisition time corresponding to the concentration of lithium ions on the first surface, according to the relationship between the open circuit potential of the first electrode and the lithium ion concentration on the solid phase surface; obtaining the adjusted open circuit potential of the first electrode according to the voltage difference between the output voltage and the measured voltage, and the open circuit potential of the first electrode at the current acquisition time; obtaining the concentration of lithium ions on the surface corresponding to the adjusted open circuit potential of the first electrode according to the relationship between the open circuit potential of the first electrode and the concentration of lithium ions on the solid phase surface, and recording it as the second surface lithium ion concentration; obtaining the maximum surface lithium ion concentration difference according to the concentration difference between the first surface lithium ion concentration and the second surface lithium ion concentration; and adjusting the distribution of the solid-phase lithium ion concentration at the current acquisition time according to the maximum surface lithium ion concentration difference.

In one embodiment, said adjusting the distribution of the solid-phase lithium ion concentration at the current acquisition time according to the maximum surface lithium ion concentration difference comprises: linearly correcting the distribution of the lithium ion concentrations of the first electrode particle along the radial direction, wherein the correction amount of the lithium ion concentration of the first electrode particle at the radial distance satisfies the formula of:

$$\Delta c_r = \frac{r}{R} \times \alpha k_{\Delta U}$$

wherein R is the radius of the particles in the electrode, r is the radial distance of the particles in the electrode, $k_{\Delta U}$ is the maximum surface lithium ion concentration difference, $\alpha$ is the correction coefficient; and determining the correction amount of the lithium ion concentration of the another electrode particle according to the conservation principle of the total amount of lithium ions inside the positive and negative electrode particles and the correction amount of the lithium ion concentration of the first electrode particle.

In one embodiment, said calculating the current SOC value of the battery is according to the formula of:

$$SOC = \frac{c_{mean} - c_{SOC=0\%}}{c_{SOC=100\%} - c_{SOC=0\%}}$$

wherein $C_{mean}$ is the average concentration of the solid-phase lithium ions, $C_{SOC=0\%}$ is the solid-phase lithium ion concentration when the SOC is equal to 0, and $C_{SOC=100\%}$ is the solid-phase lithium ion concentration when the SOC is equal to 1.

In one embodiment, the electrochemical model is a single-particle model class, said calculating the average concentration of the solid-phase lithium ions is according to the formula of:

$$c_{mean} = \frac{\int_0^R \frac{4}{3}\pi c_r r^2 dr}{\frac{4}{3}\pi R^3}$$

wherein R is the radius of the particles in the electrode, r is the radial distance of the particles in the electrode, and $C_r$ is the solid-phase lithium ion concentration of the particles at the radial distance r.

In one embodiment, the electrochemical model is a quasi-two-dimensional model class, said calculating the average concentration of the solid-phase lithium ions is according to the following formula:

$$c_{mean} = \frac{1}{N} \frac{\sum_{x=1}^{N} \int_0^R \frac{4}{3}\pi c_{x,r} r^2 dr}{\frac{4}{3}\pi R^3}$$

wherein R is the radius of the particles in the electrode, r is the radial distance of the particles in the electrode, N is the number of discrete regions set along the thickness direction of the electrode, $C_{x,r}$ is the solid-phase lithium ion concentrations of the particles in the x-th discrete region at the radial distance r.

In one embodiment, the electrochemical model is one of a single-particle model, an extended model based on a single-particle model, a quasi-two-dimensional model, and an extended model based on a quasi-two-dimensional model.

In another aspect of the invention, the device for estimating a state of charge (SOC) of a battery based on an electrochemical model, comprises a modeling module, an initial setting module, an acquisition module, a model calculation module 0, a concentration distribution correction module, and a SOC calculation module.

The modeling module id configured to build the electrochemical model of the battery.

The initial setting module is configured to set the initial value of the current state of charge SOC of the battery, and determine the initial distribution of the solid-phase lithium ion concentrations in the electrochemical model according to the initial value of the SOC.

The acquisition module is configured to perform charging/discharging test of the battery, and collect the measured voltage and the measured current of the battery after the first time interval.

The model calculation module is configured to calculate the output voltage and distribution of the solid-phase lithium ion concentration of the electrochemical model at the current acquisition time according to the measured current at the current acquisition time and the initial distribution of the solid-phase lithium ion concentrations.

The SOC calculation module is configured to calculate the average concentration of solid-phase lithium ions in the electrochemical model according to the distribution of solid-phase lithium ion concentration at the current acquisition time when the voltage difference between the output voltage and the measured voltage is within a preset range, and then calculate the current SOC value of the battery based on the average concentration.

The concentration distribution correction module is configured to, when the voltage difference between the output voltage at the current acquisition time and the measured voltage exceeds the preset range, adjust the distribution of the solid-phase lithium ion concentrations at the current acquisition time, based on the voltage difference between the output voltage and the measured voltage, and the relationship between the predicted positive/negative electrode open circuit potential (OCP) and the solid-phase surface lithium ion concentration;

In one embodiment, the acquisition module is further configured to obtain the measured voltage and measured current of the battery at the next acquisition time.

In one embodiment, the model calculation module is further configured to calculate the output voltage and distribution of the solid-phase lithium ion concentration of the electrochemical model at the next acquisition time according to the measured current at the next acquisition time and the adjusted distribution of the solid-phase lithium ion concentration.

In one embodiment, the SOC calculation module is further configured to: when a voltage difference between the output voltage at the next acquisition time and the measured voltage at the next acquisition time is within the preset range, calculating the average concentration of the solid-phase lithium ions of the electrochemical model according to the distribution of the solid-phase lithium ion concentration at the next acquisition time, and calculating the current SOC value of the battery according to the average concentration.

In one embodiment, the concentration distribution correction module comprises a maximum concentration difference calculation unit and a correction unit.

The maximum concentration difference calculation unit is configured to a positive electrode or a negative electrode as the first electrode; obtain the surface lithium ion concentration of the first electrode of the electrochemical model at the current acquisition time, which is recorded as the first surface lithium ion concentration; obtain the open circuit potential of the first electrode at the current acquisition time corresponding to the concentration of lithium ions on the first surface, according to the relationship between the open circuit potential of the first electrode and the lithium ion concentration on the solid phase surface; obtain the adjusted open circuit potential of the first electrode according to the voltage difference between the output voltage and the measured voltage, and the open circuit potential of the first electrode at the current acquisition time; obtain the concentration of lithium ions on the surface corresponding to the adjusted open circuit potential of the first electrode according to the relationship between the open circuit potential of the first electrode and the concentration of lithium ions on the solid phase surface, and recording it as the second surface lithium ion concentration; and obtaining the maximum surface lithium ion concentration difference according to the concentration difference between the first surface lithium ion concentration and the second surface lithium ion concentration; and a correction unit is configured to adjust the distribution of the solid-phase lithium ion concentration at the current acquisition time according to the maximum surface lithium ion concentration difference.

In view of the foregoing, the device and method for estimating the battery state of charge based on the electrochemical model have the following beneficial and advantageous effects:

According to the invention, an electrochemical model is established for the battery, the distribution of the lithium ion concentrations of the electrochemical model is continuously corrected according to the difference between the output voltage of the electrochemical model and the measured voltage of the battery until the voltage error is controlled within the preset range, and then the SOC of the battery is recalculated according to the corrected distribution of the lithium ion concentrations. The estimation of the SOC is not sensitive to the error of the initial value of the SOC, and can automatically converge to the true value through a period of operation, and has good true value convergence. The SOC estimation can be perform online in real time and has high accuracy.

By adopting the SPM model, the invention can be utilized to quickly correct the SOC value of the battery under low-rate stable working conditions.

By adopting the P2D model, the invention can be utilized to accurately estimate the SOC value under dynamic working conditions and high current, and has wider adaptability.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1A:
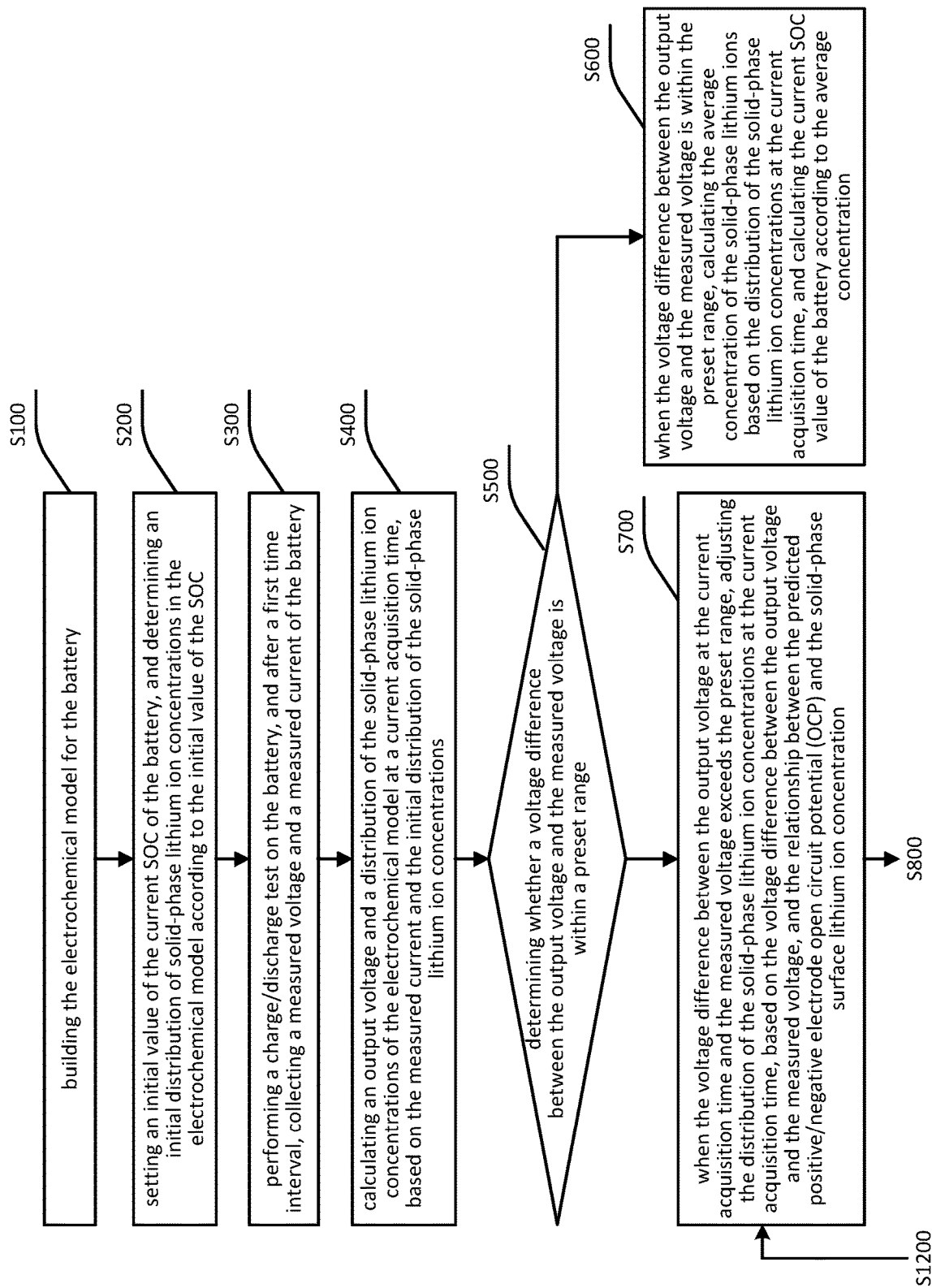
FIGS. 1A-1B show a flowchart of a method for estimating a state of charge (SOC) of a battery based on an electrochemical model, according to one embodiment of the invention.

Embodiments of the invention are described below through specific examples in conjunction with the accompanying drawings in FIGS. 1-12, and those skilled in the art can easily understand other advantages and effects of the invention from the content disclosed in this specification. The invention can also be implemented or applied through other different specific implementations, and various modifications or changes can be made to the details in this specification based on different viewpoints and applications without departing from the spirit of the invention. It should be noted that, in the case of no conflict, the following embodiments and features in the embodiments can be combined with each other.

It should be noted that the drawings provided in the following embodiments are merely illustrative in nature and serve to explain the principles of the invention, and are in no way intended to limit the invention, its application, or uses. Only the components related to the invention are shown in the drawings rather than the number, shape and size of the components in actual implementations. They do not represent the actual structure of the product. Dimensional drawing, the type, quantity and proportion of each component can be changed arbitrarily in its actual implementations. More complicate component layouts may also become apparent in view of the drawings, the specification, and the following claims.

It will be understood that, as used in the description herein and throughout the claims that follow, the meaning of "a", "an" and "one" also includes plural reference unless the context clearly dictates otherwise, i.e., the term "a", "an" or "one" not only means "only one", but also "more than one". In addition, the term "and/or" includes any and all combinations of one or more of the associated listed items.

In accordance with the purposes of the invention, as embodied and broadly described herein, this invention, in certain aspects, relates to a method and a device for estimating the state of charge (SOC) of a battery based on an electrochemical model, which solves the problem that the SOC estimation of the battery in the prior art depends on the accuracy of the initial SOC.

Figure 1B:
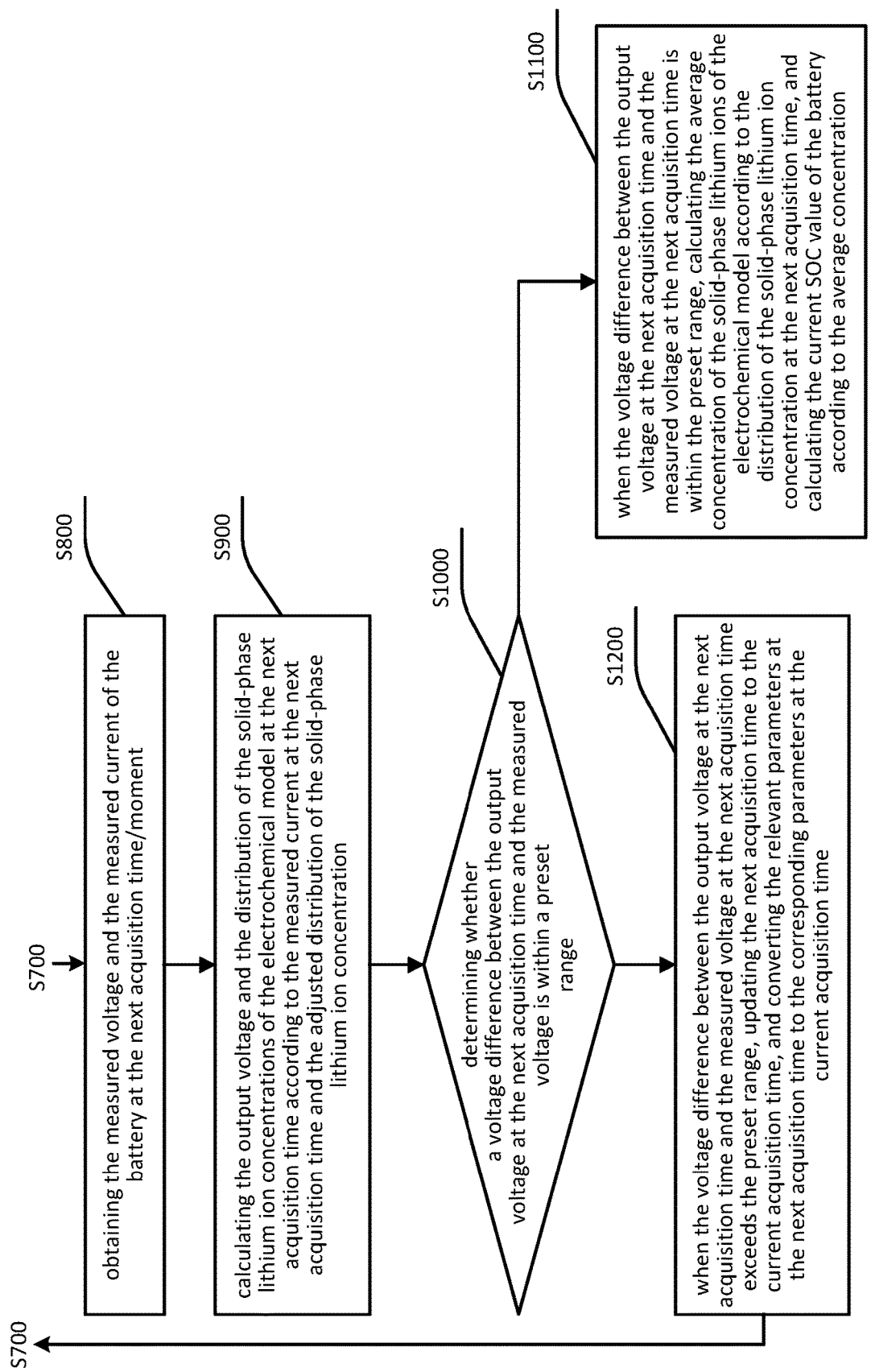

In one embodiment, as shown in FIGS. 1A-1B, the method for estimating the state of charge of a battery based on an electrochemical model includes the following steps.

At step S100, establishing the electrochemical model for the battery.

The battery in one embodiment is a lithium battery, and the electrochemical models include, but are not limited to, a quasi-two-dimensional (P2D) model, a P2D thermal coupling model, a single particle (SPM) model, a single particle model with electrolyte (SPMe), various extended single particle models (SP+ model), etc. One of the aforementioned electrochemical models for the battery can be constructed using existing techniques. After the electrochemical modeling of the battery, a terminal voltage and a distribution of the solid-phase lithium ion concentrations of the battery under different operating conditions can be calculated through the electrochemical model.

At step S200, setting an initial value of the current SOC of the battery, and determining the initial distribution of the solid-phase lithium ion concentrations in the electrochemical model according to the initial value of the SOC.

The SOC, that is, the state of charge, is defined numerically as a ratio of the current (present) capacity to the nominal capacity of the battery. It is usually expressed as a percentage, and has a value range of 0-1. When SOC=0, the battery is fully discharged. When SOC=1, the battery is fully charged.

The current SOC value of the battery is uncertain, and the initial value $SOC_0$ can be set arbitrarily. Alternatively, the current SOC value of the battery can be roughly estimated by a BMS (Battery Management System) using the existing technology, and the estimated SOC value can be used as $SOC_0$.

Based on the relationship between the SOC and the solid-phase lithium ion concentration in the electrochemical model, the distribution of the solid-phase lithium ion concentrations corresponding to the initial value $SOC_0$ is obtained, which is used as the initial distribution of the solid-phase lithium ion concentrations.

When estimating the initial distribution of the solid-phase lithium ion concentrations, it can be assumed that the initial distribution of the solid-phase lithium ion is uniform. Using the following relationship between the SOC and the solid-phase lithium ion concentration:

$$SOC = \frac{c_{mean} - c_{SOC=0\%}}{c_{SOC=100\%} - c_{SOC=0\%}},$$

the corresponding $C_{mean}$ is obtained based on the $SOC_0$, and the initial distribution of the solid-phase lithium ion concentrations is obtained based on the $C_{mean}$.

At step S300, performing a charge/discharge test on the battery, and after a first time interval, collecting the measured voltage and the measured current of the battery.

The charge or discharge test can be carried out according to a preset current rate. After the first time interval, the measured voltage and the measured current of the battery are collected.

The measured voltage and the measured current are the measured voltage and the measured current at the current acquisition time.

At step S400, calculating an output voltage and a distribution of the solid-phase lithium ion concentrations of the electrochemical model at the current acquisition time, based on the measured current and the initial distribution of the solid-phase lithium ion concentrations.

As mentioned above, the electrochemical model can calculate the terminal voltage of the battery under different working conditions (i.e., the output voltage predicted by the electrochemical model) and the distribution of the solid-phase lithium ion concentration. The above functions of the electrochemical model are utilized here, for example, under the constant current charge/discharge at the preset current, to obtain, at the first time interval point (i.e., the current acquisition time), the output voltage and the distribution of the solid-phase lithium ion concentrations predicted by the electrochemical model.

At step S500, determining whether a voltage difference between the output voltage and the measured voltage is within a preset range.

At step S600, when the voltage difference between the output voltage and the measured voltage is within the preset range, calculating the average concentration of the solid-phase lithium ions based on the distribution of the solid-phase lithium ion concentrations at the current acquisition time, and calculating the current SOC value of the battery according to the average concentration.

In one embodiment, at step S300, before the charge/discharge test, the battery is left to stand (i.e. no charge and discharge) for a preset time to ensure that there is no concentration polarization inside the battery (i.e. the solid-phase lithium ions are evenly distributed), then performing the charge or discharge test.

In one embodiment, step S600 includes the steps of Step S610 and S620.

At step S610, calculating a total amount of the lithium ions in all solid phase particles according to the distribution of the solid phase lithium ion concentration at the current acquisition time/moment.

At step S620, dividing the total amount of the lithium ions in all solid-phase particles by the volume of all solid-phase particles to obtain the average concentration of the solid-phase lithium ions in the electrochemical model.

In one embodiment, the electrochemical model is a single-particle model, such as an SPM or an extended model based on the SPM. Since this type of models assumes that the electrode material is composed of a spherical particle, an average concentration $C_{mean}$ of the solid-phase lithium ions can be calculated according to the following formula:

$$c_{mean} = \frac{\int_0^R \frac{4}{3}\pi c_r r^2 dr}{\frac{4}{3}\pi R^3}$$

wherein R is the radius of the particles in the electrode, r is the radial distance of the particles in the electrode, and $C_r$ is the solid-phase lithium ion concentration of the particles at the radial distance r.

In one embodiment, the electrochemical model is a quasi-two-dimensional model, such as a P2D or an extended model based on the P2D. This type of models takes electrode thickness into account and assumes that the electrode material is composed of multiple spherical particles. Assuming that it is divided into N discrete areas along the electrode thickness direction of the positive electrode/negative electrode, each discrete area has a number of particles with a radius R, and the distribution of the lithium ion concentrations of these particles is the same, the average concentration $C_{mean}$ of the solid-phase lithium ions can be calculated according to the following formula:

$$c_{mean} = \frac{1}{N} \frac{\sum_{x=1}^{N} \int_0^R \frac{4}{3}\pi c_{x,r} r^2 dr}{\frac{4}{3}\pi R^3}$$

wherein $C_{x,r}$ is the solid-phase lithium ion concentration of the particles in the x-th discrete region at the radial distance r.

The current SOC value of the battery is then calculated according to the following formula:

$$SOC = \frac{c_{mean} - c_{SOC=0\%}}{c_{SOC=100\%} - c_{SOC=0\%}}$$

wherein $C_{mean}$ is the average concentration of the solid-phase lithium ions, $C_{SOC=0\%}$ is the solid-phase lithium ion concentration when the SOC is equal to 0, and $C_{SOC=100\%}$ is the solid-phase lithium ion concentration when the SOC is equal to 1.

In one embodiment, the method for estimating the state of charge of the battery further includes the following steps.

at step S700, when the voltage difference between the output voltage at the current acquisition time and the measured voltage exceeds the preset range, adjusting the distribution of the solid-phase lithium ion concentrations at the current acquisition time, based on the voltage difference between the output voltage and the measured voltage, and the relationship between the predicted positive/negative electrode open circuit potential (OCP) and the solid-phase surface lithium ion concentration.

At step S800, obtaining the measured voltage and the measured current of the battery at the next acquisition time/moment.

At step S900, calculating the output voltage and the distribution of the solid-phase lithium ion concentrations of the electrochemical model at the next acquisition time according to the measured current at the next acquisition time and the adjusted distribution of the solid-phase lithium ion concentration.

At step S1000, determining whether the voltage difference between the output voltage at the next acquisition time and the measured voltage is within a preset range.

At step S1100, when the voltage difference between the output voltage at the next acquisition time and the measured voltage at the next acquisition time is within the preset range, calculating the average concentration of the solid-phase lithium ions of the electrochemical model according to the distribution of the solid-phase lithium ion concentration at the next acquisition time, and calculating the current SOC value of the battery according to the average concentration.

At step S1200, when the voltage difference between the output voltage at the next acquisition time and the measured voltage at the next acquisition time exceeds the preset range, updating the next acquisition time to the current acquisition time, and converting the relevant parameters at the next acquisition time to the corresponding parameters at the current acquisition time, and going to step S700.

Through the above process, the distribution of the solid-phase lithium ion concentration of the electrochemical model is continuously corrected until the difference between the output voltage of the electrochemical model and the measured voltage is controlled within the threshold. When the difference between the output voltage of the electrochemical model and the measured voltage is within the threshold, the electrochemical model has completed the correction of the distribution of the lithium ion concentrations. At this time, the SOC value can be recalculated according to the distribution of the lithium ion concentrations to obtain an accurate SOC.

In one embodiment, step S700 specifically includes the following steps.

At step S710, obtaining the maximum surface lithium ion concentration difference according to the voltage difference between the output voltage and the measured voltage, and the relationship between the predicted positive/negative open electrode OCP and the solid phase surface lithium ion concentration.

At step S720, adjusting the distribution of the solid-phase lithium ion concentration at the current acquisition time according to the maximum surface lithium ion concentration difference.

In one embodiment, step S710 includes the following steps of S711-S716.

At step S711, selecting a positive electrode or a negative electrode as the first electrode.

At step S712, obtaining the surface lithium ion concentration of the first electrode of the electrochemical model at the current acquisition time, which is recorded as the first surface lithium ion concentration.

At step S713, obtaining the open circuit potential of the first electrode at the current acquisition time according to the relationship between the open circuit potential of the first electrode and the lithium ion concentration on the solid phase surface.

At step S714, obtaining the adjusted open circuit potential of the first electrode according to the voltage difference between the output voltage and the measured voltage, and the open circuit potential of the first electrode at the current acquisition time.

At step S715, obtaining the surface lithium ion concentration corresponding to the adjusted open circuit potential of the first electrode according to the relationship between the open circuit potential of the first electrode and the concentration of lithium ions on the solid phase surface, and recording it as the second surface lithium ion concentration.

At step S716, obtaining the maximum surface lithium ion concentration difference according to the concentration difference between the first surface lithium ion concentration and the second surface lithium ion concentration.

In one embodiment, step S720 includes steps S721 and S722.

At step S721, linearly correcting the distribution of the lithium ion concentrations of the first electrode particle along the radial direction, wherein the correction amount of the lithium ion concentration of the first electrode particle at the radial distance r satisfies the following formula:

$$\Delta c_r = \frac{r}{R} \times \alpha k_{\Delta U}$$

wherein R is the particle radius, $k_{\Delta U}$ is the maximum surface lithium ion concentration difference, $\alpha$ is the correction coefficient.

At step S722, determining the correction amount of the lithium ion concentration of the another electrode particle according to the conservation principle of the total amount of lithium ions inside the positive and negative electrode particles and the correction amount of the lithium ion concentration of the first electrode particle.

In one embodiment, by establishing the electrochemical model of the battery, the distribution of the lithium ion concentrations of the electrochemical model is continuously corrected according to the difference between the output voltage of the electrochemical model and the measured voltage of the battery until the voltage error is controlled within a preset range, and the SOC of the battery is then recalculated according to the corrected distribution of the lithium ion concentrations. According to this embodiment, the accuracy of the initial value of the SOC and the initial distribution of the solid-phase lithium ion concentrations are not required. It can be corrected in real time online and the estimation accuracy of the SOC is high.

Figure 2:
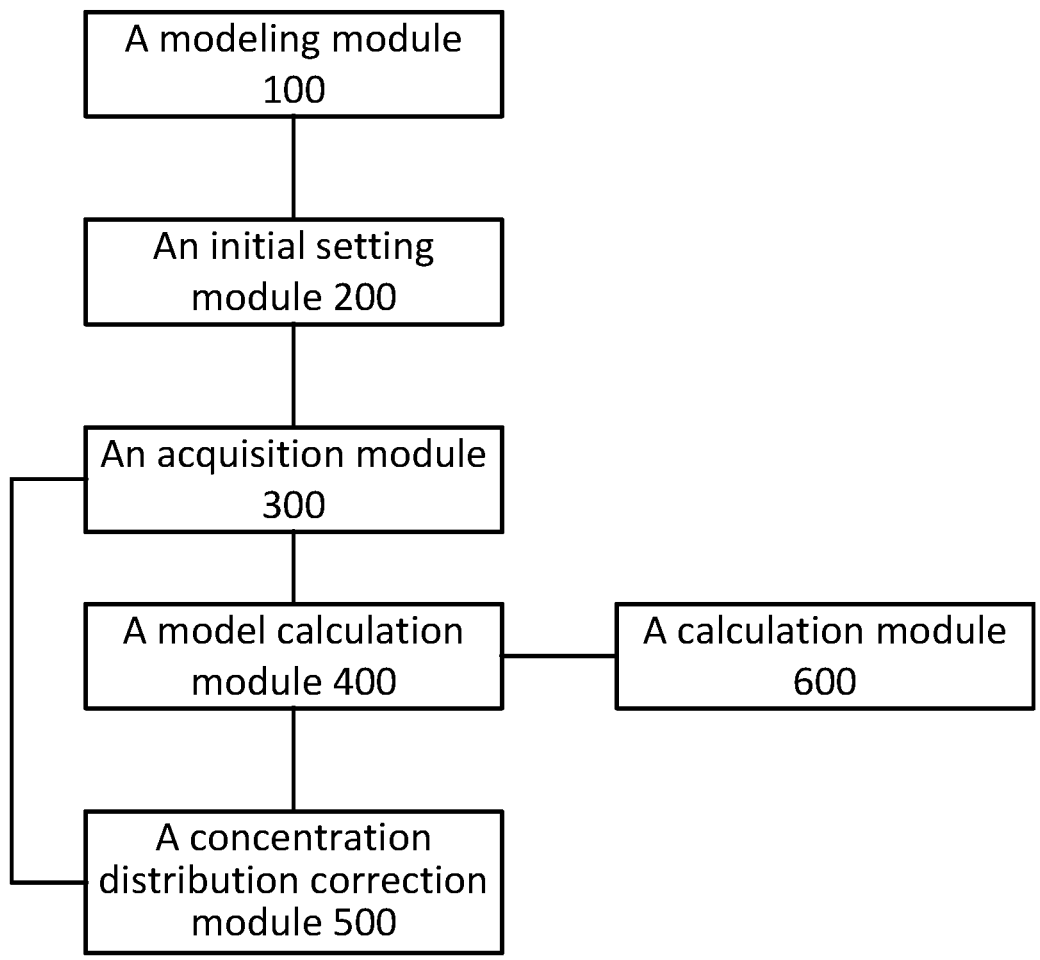
FIG. 2 is a structural representation of a device for estimating a SOC of a battery based on an electrochemical model, according to one embodiment of the invention.

FIG. 2 shows schematically a device for estimating the state of charge of a battery based on an electrochemical model according to one embodiment of the invention. The device includes a modeling module 100, an initial setting module 200, an acquisition module 300, a model calculation module 400, a concentration distribution correction module 500, and a SOC calculation module 600.

The modeling module 100 is configured to build an electrochemical model of the battery.

The initial setting module 200 is configured to set the initial value of the current state of charge SOC of the battery, and determine the initial distribution of the solid-phase lithium ion concentrations in the electrochemical model according to the initial value of the SOC.

The acquisition module 300 is configured to perform charging/discharging test of the battery, and collect the measured voltage and the measured current of the battery after the first time interval.

The model calculation module 400 is configured to calculate the output voltage and distribution of the solid-phase lithium ion concentration of the electrochemical model at the current acquisition time according to the measured current at the current acquisition time and the initial distribution of the solid-phase lithium ion concentrations.

The SOC calculation module 600 is configured to calculate the average concentration of solid-phase lithium ions in the electrochemical model according to the distribution of solid-phase lithium ion concentration at the current acquisition time when the voltage difference between the output voltage and the measured voltage is within a preset range, and then calculate the current SOC value of the battery based on the average concentration.

In one embodiment, the acquisition module 300 is also configured to rest the battery for a preset time prior to the charge/discharge test, so as to ensure that there is no concentration polarization inside the battery.

In one embodiment, the SOC calculation module 600 is also used to calculate the total amount of lithium ions in all solid-phase particles according to the distribution of the solid-phase lithium ion concentration at the current acquisition time; and dividing the total amount of lithium ions in all solid-phase particles by the volume of all solid-phase particles to obtain the average concentration of solid-phase lithium ions in the electrochemical model.

In one embodiment, when the electrochemical model is a single-particle model, the SOC calculation module 600 is also used to calculate the average concentration of the solid-phase lithium ions of the electrochemical model according to the following formula:

$$c_{mean} = \frac{\int_0^R \frac{4}{3}\pi c_r r^2 dr}{\frac{4}{3}\pi R^3}$$

wherein R is the radius of the particles in the electrode, r is the radial distance of the particles in the electrode, and $C_r$ is the solid-phase lithium ion concentration of the particles at the radial distance r.

In one embodiment, when the electrochemical model is a quasi-two-dimensional model, the SOC calculation module 600 is also used to calculate the average concentration of the solid-phase lithium ions of the electrochemical model according to the following formula:

$$c_{mean} = \frac{1}{N} \frac{\sum_{x=1}^{N} \int_0^R \frac{4}{3}\pi c_{x,r} r^2 dr}{\frac{4}{3}\pi R^3}$$

wherein $C_{x,r}$ is the solid-phase lithium ion concentration of the particles in the x-th discrete region at the radial distance r.

In one embodiment, the SOC calculation module 600 is also used to calculate the current SOC value of the battery according to the following formula:

$$SOC = \frac{c_{mean} - c_{SOC=0\%}}{c_{SOC=100\%} - c_{SOC=0\%}}$$

wherein $C_{mean}$ is the average concentration of the solid-phase lithium ions, $C_{SOC=0\%}$ is the solid-phase lithium ion concentration when the SOC is equal to 0, and $C_{SOC=100\%}$ is the solid-phase lithium ion concentration when the SOC is equal to 1.

The concentration distribution correction module 500 is configured to, when the voltage difference between the output voltage at the current acquisition time and the measured voltage exceeds the preset range, adjust the distribution of the solid-phase lithium ion concentrations at the current acquisition time, based on the voltage difference between the output voltage and the measured voltage, and the relationship between the predicted positive/negative electrode open circuit potential (OCP) and the solid-phase surface lithium ion concentration.

In one embodiment, the collection module 300 is also used to obtain the measured voltage and the measured current of the battery at the next acquisition time.

In one embodiment, the model calculation module 400 is also used to calculate the output voltage and the distribution of the solid-phase lithium ion concentrations of the electrochemical model at the next acquisition time according to the measured current at the next acquisition time and the adjusted distribution of the solid-phase lithium ion concentration.

In one embodiment, the SOC calculation module 600 is also used to calculate the average concentration of the solid-phase lithium ions of the electrochemical model according to the distribution of the solid-phase lithium ion concentration at the next acquisition time, and calculate the current SOC value of the battery based on the average concentration.

In one embodiment, the concentration distribution correction module 500 is also used to, when the voltage difference between the output voltage at the next acquisition time and the measured voltage at the next acquisition time exceeds the preset range, update the next acquisition time to the current acquisition time, and adjust the distribution of the solid phase lithium ion concentration at the current acquisition time according to the voltage difference between the output voltage at the current acquisition time and the measured voltage, and the relationship between the predicted positive/negative electrode OCP and the lithium ion concentration on the solid phase surface.

Through the above process, the distribution of the solid-phase lithium ion concentration of the electrochemical model is continuously corrected until the difference between the output voltage of the electrochemical model and the measured voltage is controlled within the threshold. When the difference between the output voltage of the electrochemical model and the measured voltage is within the threshold, the electrochemical model has completed the correction of the distribution of the lithium ion concentrations. At this time, the SOC value can be recalculated according to the distribution of the lithium ion concentrations to obtain an accurate SOC.

In one embodiment, the concentration distribution correction module 500 includes an maximum concentration difference calculation unit that is used to obtain the maximum surface lithium ion concentration difference according to the voltage difference between the output voltage and the measured voltage, and the relationship between the predicted positive/negative open electrode OCP and the solid phase surface lithium ion concentration.

The concentration distribution correction module 500 also includes correction unit that is also used to adjust the distribution of the solid-phase lithium ion concentration at the current acquisition time according to the maximum surface lithium ion concentration difference.

In one embodiment, the maximum concentration difference calculation unit is also used to select a positive electrode or a negative electrode as the first electrode; obtain the surface lithium ion concentration of the first electrode of the electrochemical model at the current acquisition time, which is recorded as the first surface lithium ion concentration; obtain the open circuit potential of the first electrode at the current acquisition time according to the relationship between the open circuit potential of the first electrode and the lithium ion concentration on the solid phase surface; obtain the adjusted open circuit potential of the first electrode according to the voltage difference between the output voltage and the measured voltage, and the open circuit potential of the first electrode at the current acquisition time; obtain the surface lithium ion concentration corresponding to the adjusted open circuit potential of the first electrode according to the relationship between the open circuit potential of the first electrode and the concentration of lithium ions on the solid phase surface, and recording it as the second surface lithium ion concentration; and obtain the maximum surface lithium ion concentration difference according to the concentration difference between the first surface lithium ion concentration and the second surface lithium ion concentration.

In one embodiment, the correction unit is also used to linearly correct the distribution of the lithium ion concentrations of the first electrode particle along the radial direction, wherein the correction amount of the lithium ion concentration of the first electrode particle at the radial distance r satisfies the following formula:

$$\Delta c_r = \frac{r}{R} \times \alpha k_{\Delta U}$$

wherein R is the particle radius, $k_{\Delta U}$ is the maximum surface lithium ion concentration difference, $\alpha$ is the correction coefficient.

According to the conservation principle of the total amount of lithium ions inside the positive and negative particles and the correction amount of lithium ion concentration of the first electrode particle, the correction amount of lithium ion concentration of the other electrode particle is determined.

It should be noted that the embodiments of the device for electrochemical model-based battery SOC estimation disclosed by the invention is based on the same inventive concept as the aforementioned embodiments of the method for the electrochemical model-based battery SOC estimation, and can achieve the same technical effect. Therefore, other specific content of the embodiments of the device for estimating the SOC of the battery based on the electrochemical model can refer to the description of the content of the embodiments of the method for estimating the SOC of the battery based on the electrochemical model.

Without intent to limit the scope of the invention, two exemplary application examples, which apply the above disclosed electrochemical model-based battery SOC estimation method to the SOC estimation of a lithium cobalt oxide battery, are given below. In these examples, a 0.68 Ah lithium cobalt oxide battery is utilized. It should be noted that the method is also applicable to other lithium batteries.

EXAMPLE 1

The electrochemical model is an SPM model. The SOC estimation is performed as follows.

Step 1.1: selecting the SPM model to model the lithium cobalt oxide battery.

Figure 3:
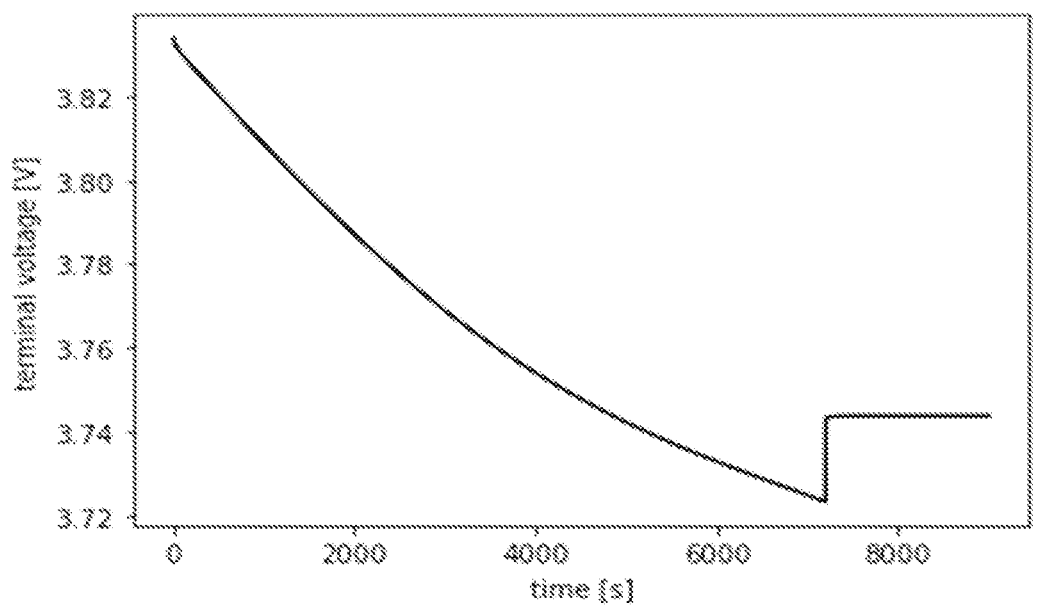
FIG. 3 is a change curve of the terminal voltage output by the SPM model with time, according to one embodiment of the invention.

Taking the operating condition of 0.1C discharge for 2 hours and standing still for 0.5 hours as an example, the change curve of the terminal voltage output by the SPM model with time is shown in FIG. 3.

Step 1.2: setting the initial value $SOC_C$ of the SOC, and determining the initial distribution of the solid-phase lithium ion concentrations in the electrochemical model according to the initial value $SOC_0$.

Assuming that the initial value $C_{i,0}$ of the solid-phase lithium ion concentration on the particle radial distribution is equal, that is, $C_{i,0}=C_{mean}$, i=0, 1, . . . n, $C_{mean}$ is the average concentration of the solid-phase lithium ions, and n is the number of the radial nodes of positive/negative electrode particles.

In the single particle model, the relationship between the SOC and the lithium ion concentration of the positive/negative electrode particles is determined by the following formula:

$$SOC = \frac{c_{mean} - c_{SOC=0\%}}{c_{SOC=100\%} - c_{SOC=0\%}}$$

wherein $C_{mean}$ is the average concentration of the solid-phase lithium ions, $C_{SOC=0\%}$ is the solid-phase lithium ion concentration when the SOC is equal to 0, and $C_{SOC=100\%}$ is the solid-phase lithium ion concentration when the SOC is equal to 1.

Using the above formula, the corresponding $C_{mean}$ value is obtained according to the initial value $SOC_0$, and then $C_{i,0}$ is obtained, based on $C_{i,0}=C_{mean}$, whereby the initial distribution of lithium ion concentration in the solid phase particles is obtained.

Figure 4:
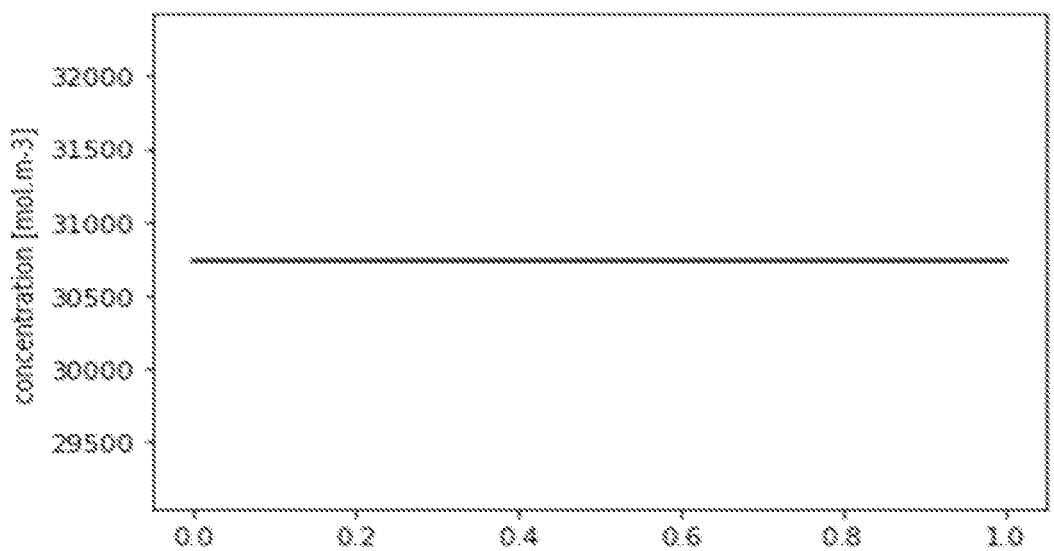
FIG. 4 is a distribution of the solid-phase lithium ion concentrations in the positive electrode, according to one embodiment of the invention.

Preferably, prior to proceeding to the next step, the battery is allowed to stand still (i.e. without charge and discharge) for a sufficient time $T_0$, e.g., longer than 1 hour, so that the concentration of lithium ions in the solid-phase particles can be evenly distributed, thereby making the estimation of the initial distribution of the solid-phase lithium ion concentrations more accurate. FIG. 4 shows the distribution of the solid-phase lithium ion concentrations in the positive electrode, where the horizontal axis is the normalized radial distance, and the vertical axis is the solid-phase lithium ion concentrations. As shown in FIG. 4, in the radial distribution of particles, the solid-phase lithium ion concentrations are basically equal. Of them, the normalized radial distance is r/R, r is the radial distance of the spherical particles, and R is the radius of the spherical particles.

Step 1.3: selecting a stable working condition, such as the discharge current I=0.1C for correction, assuming that the time interval for the BMS to acquire the voltage is 1 s.

Calculating the output voltage $U_{model}$ when the model is discharged for is and the distribution of solid-phase lithium ion concentration at this time.

Comparing the output voltage $U_{model}$ predicted by the model with the battery voltage $U_{real}$ measured by the BMS to calculate the voltage error $\Delta U=U_{real}-U_{model}$. If $|\Delta U|>$threshold, the distribution of the lithium ion concentrations in the solid phase particles needs to be corrected. At this time, the distribution of the lithium ion concentrations in the solid phase particles is corrected, according to the relationship between the positive/negative electrode OCP and the lithium ion concentration on the solid phase surface.

For the correction of the distribution of the lithium ion concentrations, linear correction can be utilized. Other forms of correction can also be employed. In one embodiment, the distribution of the lithium ion concentrations of the positive electrode particles is corrected first, and then that of the negative electrode particles is corrected, or vice versa. Alternatively, the distribution of the lithium ion concentrations of particles with a certain polarity are selected to be corrected first, according to certain rules. But this is not limited.

In this embodiment, a linear correction is made to the distribution of the lithium ion concentrations of the positive electrode particles along the radial direction, that is, the concentration correction value at the center of the sphere is 0, and the concentration correction value at the surface is the largest, and the concentration correction along the radial direction satisfies the formula of:

$$\Delta c_{r+} = \frac{r}{R} \times \alpha k_{\Delta U}$$

wherein $\Delta C_{r+}$ is the correction amount of the lithium ion concentrations of the positive electrode particles at the radial distance r; $k_{\Delta U}$ is the maximum surface lithium ion concentration difference; a is the correction coefficient that has a value in the range of 0-1. α=0.5 is selected in this case. It can be seen that when r=0, $\Delta C_{r+}=0$, indicating that the concentration correction value at the center of the sphere is 0; when r=1, $\Delta C_{r+}$ is the largest, indicating that the surface concentration correction value is the largest.

$k_{\Delta U}$ is the concentration difference between the surface lithium ion concentration corresponding to the positive electrode OCP $U_{ocp-model}$ at the current acquisition time and the surface lithium ion concentration corresponding to ($U_{ocp-model}+\Delta U$). $k_{\Delta U}$ is obtained according to the relationship between the positive/negative electrode OCP and the solid surface lithium between ion concentration.

The relationship between the positive electrode OCP of the lithium cobalt oxide active material and the concentration of lithium ions on the surface is shown in Table 1:

TABLE 1

The relationship between the positive electrode OCP of the lithium cobalt oxide active material and the concentration of lithium ions on the surface

| Positive electrode OCP/[V] | 4.042 | 4.021 | 3.998 | 3.978 | 3.961 | 3.948 | 3.937 | 3.929 | 3.923 |
|---|---|---|---|---|---|---|---|---|---|
| Surface lithium ion concentration/ [mol · m$^{-3}$] | 30000 | 31000 | 32000 | 33000 | 34000 | 35000 | 36000 | 37000 | 38000 |
| Positive electrode OCP/[V] | 3.918 | 3.915 | 3.912 | 3.909 | 3.908 | 3.907 | 3.906 | 3.900 | 3.857 |

TABLE 1-continued

The relationship between the positive electrode OCP of the lithium cobalt oxide active material and the concentration of lithium ions on the surface

| Surface lithium ion concentration/ [mol · m⁻³] | 39000 | 40000 | 42000 | 43000 | 44000 | 45000 | 46000 | 47000 | 48000 |
|---|---|---|---|---|---|---|---|---|---|

Assuming that the lithium ion concentrations on the surface of the solid-phase positive electrode at the current acquisition time is 34000, the above table shows that the corresponding positive electrode OCP ($U_{ocp-model}$) is 3.961 V. Considering The absolute value of the voltage error between the voltage $U_{model}$ output by the model and the measured voltage $U_{real}$ is greater than the threshold, in order to reduce the voltage error, the current OCP $U_{ocp-model}$ needs to be adjusted to ($U_{ocp-model}+\Delta U$). Assuming that the current positive electrode OCP needs to be adjusted to 3.948 v, and the corresponding surface lithium ions is 35000, so the concentration difference of the surface lithium ions is obtained to be 1000 (=35000-34000), Such the concentration difference is set to be $k_{\Delta U}$, that is, $k_{\Delta U}=1000$ at the current acquisition time.

Figure 5:
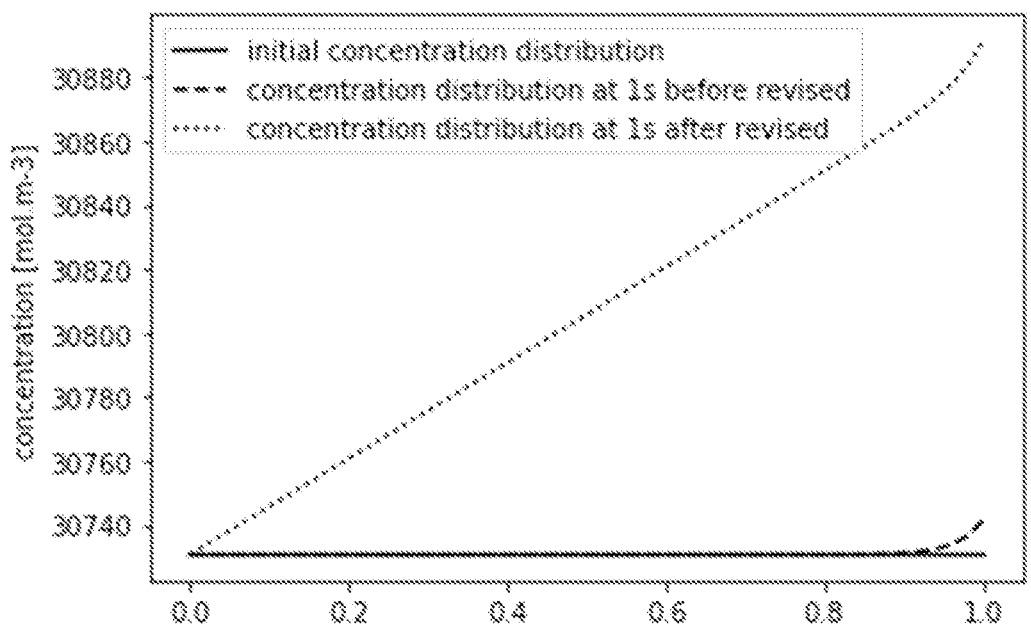
FIG. 5 is a distribution of the lithium ion concentrations output by the electrochemical model before and after the correction of the first acquisition time, according to one embodiment of the invention.

According to the above method, the distribution of the lithium ion concentrations in the solid phase is corrected, as shown in FIG. 5.

Considering that the concentration correction should ensure the conservation of the total amount of lithium ions inside the positive and negative electrode particles, the correction value of the distribution of the lithium ion concentrations of the negative electrode particles must satisfies the formula of:

$$L_+\varepsilon_+ \int_0^{R_+} \frac{4}{3}\pi\Delta c_{r+} r^2 dr = -L_-\varepsilon_- \int_0^{R_-} \frac{4}{3}\pi\Delta c_{r-} r^2 dr$$

wherein $L_+$, $L_-$ are the thicknesses of the positive and negative electrodes, respectively, $\varepsilon_+$, $\varepsilon_-$ are the volume fractions of the active materials of the positive and negative electrodes, respectively, and $R_+$, $R_-$ are the particle radii of the positive and negative electrodes, respectively. The volume fraction of the positive electrode active material=the volume of the positive electrode active material/the positive electrode volume, while the definition of the volume fraction of the negative electrode active material is similar.

Step 1.4: based on the concentration distribution at the previous acquisition time, calculating the terminal voltage $U_{model}$ of the electrochemical model at the next acquisition time, and correcting again the concentration distribution at the current acquisition time, according to the difference between the terminal voltage $U_{model}$ and the battery voltage $U_{real}$ measured by the BMS.

Figure 6:
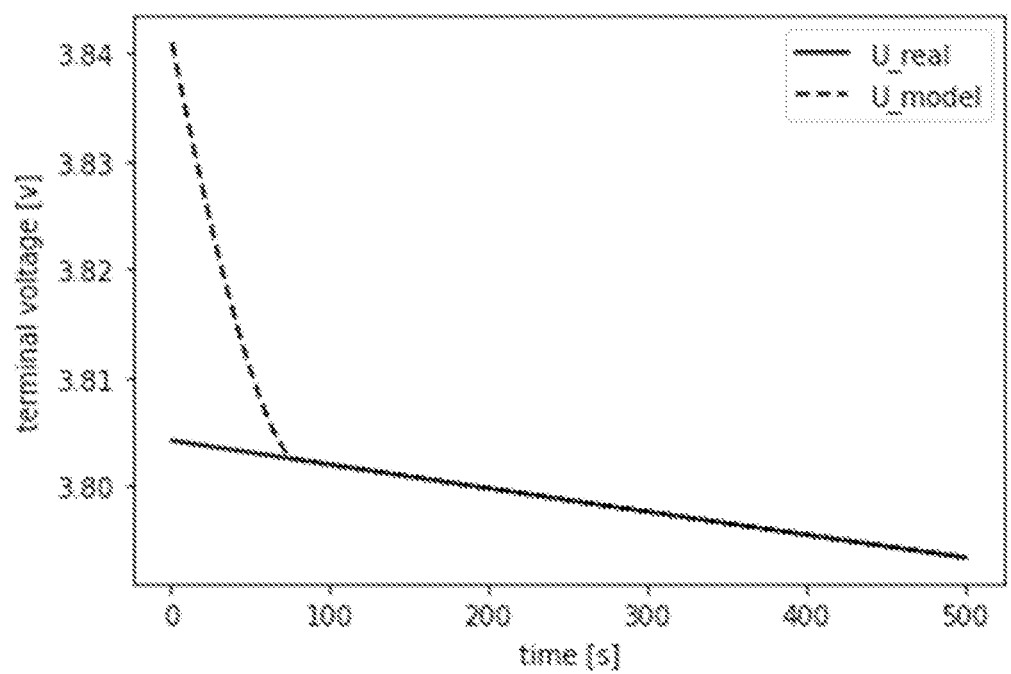
FIG. 6 is a change curve of the output voltage and the measured voltage in the correction process, according to one embodiment of the invention.

Step 1.5: performing step 1.4 several times until the error between the voltage $U_{model}$ calculated by the electrochemical model and the measured voltage $U_{real}$ is controlled within the threshold. The curve of U_model (i.e., $U_{model}$) and U_real (i.e., $U_{real}$) during the correction) process is shown in FIG. 6. It can be seen that at about 76 seconds, the error is controlled within the threshold (=5 mV), and the concentration distribution of the electrochemical model is completed.

Calculating the average concentration $C_{mean}$ of solid-phase lithium ions at this time, and then calculating the current SOC value of the battery based on $C_{mean}$.

The SPM model is a reduced-order electrochemical model, and the calculation is relatively simple. According to the model, the terminal voltage of the battery can be quickly calculated to achieve the purpose of quickly correcting the SOC. The SPM model is suitable for quick correction of the battery SOC value under low-rate stable conditions.

EXAMPLE 2

The electrochemical model is the P2D model. The SOC estimation based on the P2D model is basically same as that of Example 2, including:

Step 2.1: selecting the P2D model to model the lithium cobalt oxide battery.

Figure 7:
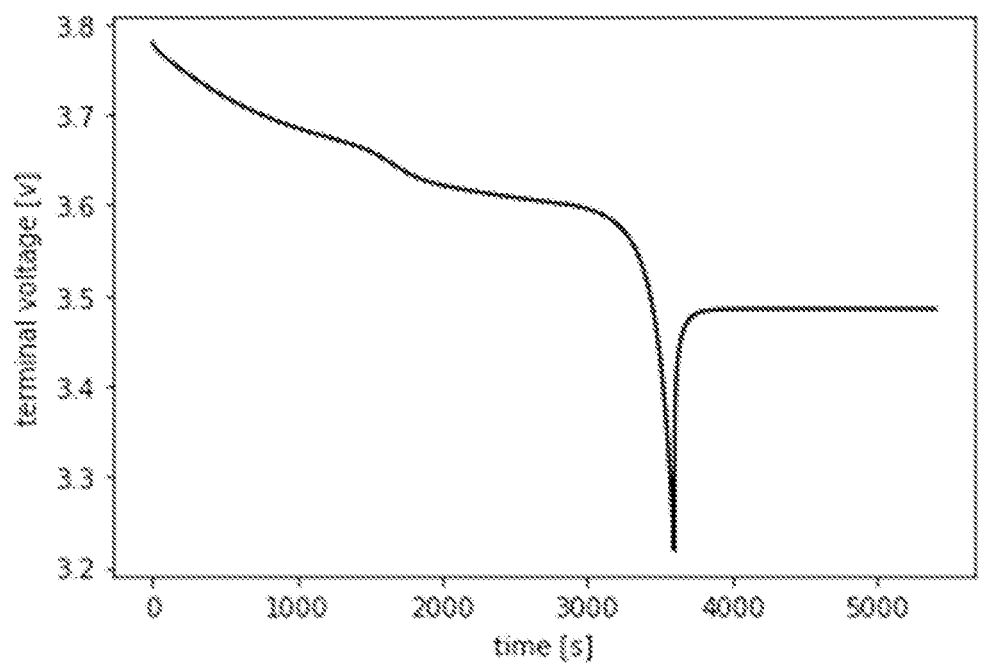
FIG. 7 is a change curve of the terminal voltage output by the P2D model with time, according to one embodiment of the invention.

Taking the operating condition of 1C discharge for 1 hour and standing for 0.5 hours as an example, the change curve of the terminal voltage output by the P2D model with time is shown in FIG. 7.

Step 2.2: setting the initial value $SOC_0$ of the SOC, and determining the initial distribution of the solid-phase lithium ion concentrations in the electrochemical model according to the initial value SOC0.

In the P2D model, the numerical solution of the distribution of the solid-phase lithium ion concentrations is in the form of a two-dimensional array, one dimension is along the electrode thickness direction, and the other dimension is along the particle radial direction.

Supposing it is divided into N discrete regions along the electrode thickness direction of the positive/negative electrode, each discrete region has a number of active particles, and each active particle has n radial nodes distributed along the radial direction. $C_{x,i}$ represents the solid-phase lithium ion concentrations of the active particles of the x-th discrete region on the i-th radial node, x=1, 2, . . . N, i=0, 1, n, and n is the number of the radial nodes of positive/negative electrode particles.

Assuming that the initial value of the solid-phase lithium ion concentrations of each particle in each discrete region on the particle radial distribution is equal, that is, $C_{x,i,0}=C_{mean}$, $C_{mean}$ is the average concentration of the solid-phase lithium ions.

In the single particle model, the relationship between the SOC and the lithium ion concentration of the positive/negative electrode particles is determined by the following formula Using the formula of $$SOC = \frac{c_{mean} - c_{SOC=0\%}}{c_{SOC=100\%} - c_{SOC=0\%}},$$

the corresponding $C_{mean}$ value is obtained according to the initial value $SOC_0$; then $C_{x,i,0}$ is obtained according to $C_{x,i,0}=C_{mean}$, so as to obtain the initial distribution of the solid-phase lithium ion concentrations in the P2D model.

Step 2.3: selecting a stable working condition, such as discharge current I=1C for correction, assuming that the time interval for the BMS to acquire voltage is 1 second. Calculating the output voltage $U_{model}$ when the model is discharged for 1 second and the concentration distribution of the solid-phase lithium ions at this time. Calculating the voltage error $\Delta U$. If $|\Delta U|$>threshold, the distribution of the lithium ion concentrations in the solid phase particles needs to be corrected.

For the correction of the distribution of the lithium ion concentrations, linear correction or other forms of correction can be employed. The distribution of the lithium ion concentrations of particles with a certain polarity can also be utilized according to certain rules to be corrected first.

In this example, firstly, the concentration distribution of the lithium ions on the surface of the positive electrode particles is corrected along the thickness direction of the electrode. The correction amount of the lithium ion concentrations on the surface of the positive electrode particles in the x-th discrete region is $\Delta c_{x+} = \alpha k_{\Delta U}$, where x=1, 2, ... N, and $k_{\Delta U}$ is same as above.

Then, linearly correcting the concentration distribution of the positive electrode particles along the radial direction, and the concentration correction along the radial direction satisfies the formula of:

$$\Delta c_{x,r+} = \frac{r}{R} \times \Delta c_{x+}.$$

The distribution of the solid-phase lithium ion concentrations is corrected according to the method described above.

Considering that the concentration correction should ensure the conservation of the total amount of lithium ions inside the positive and negative electrode particles, the correction value of the distribution of the lithium ion concentrations of the negative electrode particles must satisfies the formula of:

$$L_+\varepsilon_+ \sum_{x=1}^{N_+} \int_0^{R_+} \frac{4}{3}\pi \Delta c_{x,r+} r^2 dr = -L_-\varepsilon_- \sum_{x=1}^{N_-} \int_0^{R_-} \frac{4}{3}\pi \Delta c_{x,r-} r^2 dr$$

wherein $L_+$, $L_-$ are the thicknesses of the positive and negative electrodes, respectively, $\varepsilon_+$, $\varepsilon_-$ are the volume fractions of the active materials of the positive and negative electrodes, respectively, $N_+$, $N_-$ are the numbers of the discrete regions of the positive and negative electrodes, respectively, and $R_+$, $R_-$ are the particle radii of the positive and negative electrodes, respectively. $\Delta C_{x,r-}$ is the correction amount of the lithium ion concentrations of the negative electrode particles in the x-th discrete area at the radial distance r.

Figure 8:
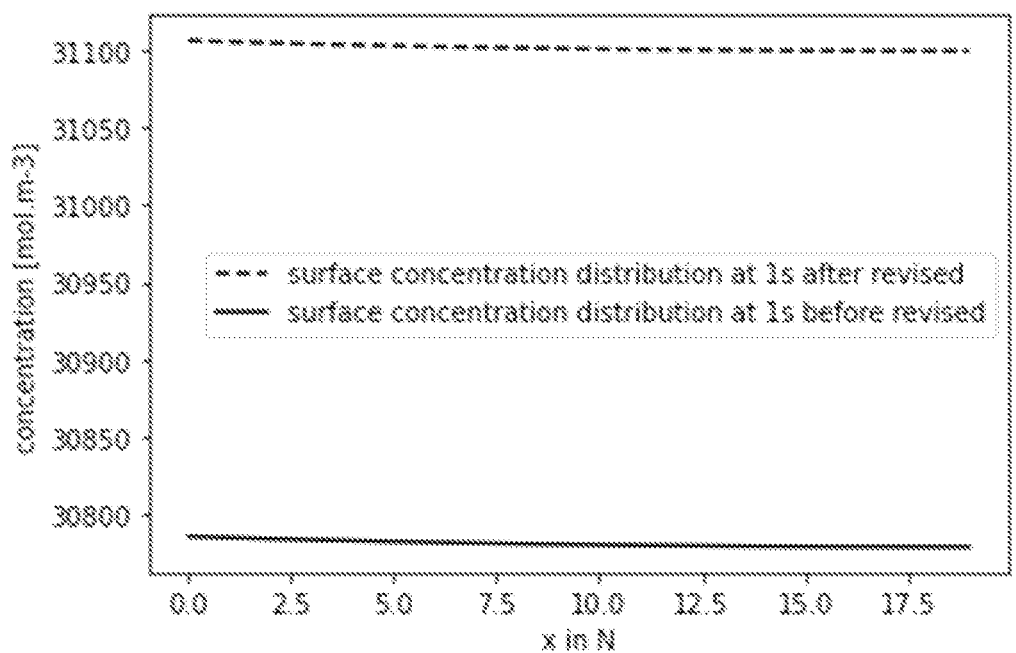
FIG. 8 is a surface concentration distribution of active particles before and after the correction of the first acquisition time in each discrete area of the positive electrode, according to one embodiment of the invention.
Figure 9:
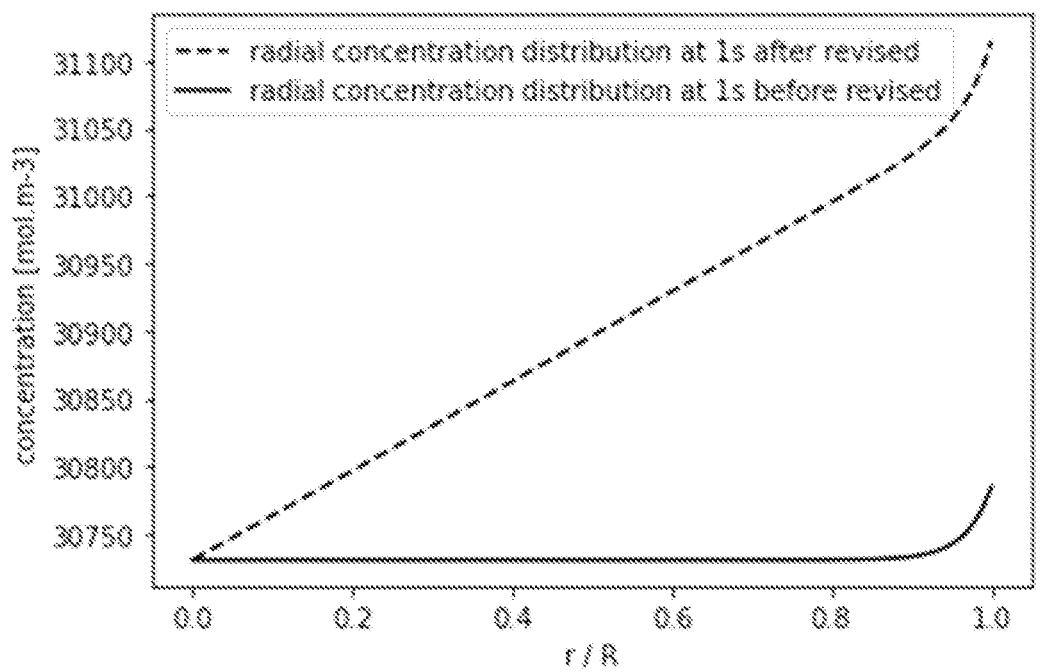
FIG. 9 is a concentration distribution of particles in the radial direction before and after correction of the first acquisition time in the first discrete area, according to one embodiment of the invention.

The surface concentration distribution of active particles before and after the correction of the first acquisition time in each discrete area of the positive electrode is shown in FIG. 8. The concentration distribution of active particles in the radial direction of the first acquisition time before and after correction in the x=1 area of the positive electrode is shown in FIG. 9. For the rest of the discrete areas, the correction of the concentration distribution of the active particles in the radial direction is the same as that in the x=1 area.

Step 2.4: based on the concentration distribution at the previous acquisition time, calculating the terminal voltage $U_{model}$ of the electrochemical model at the next acquisition time, and correcting again the concentration distribution at the current acquisition time, according to the difference between the terminal voltage $U_{model}$ and the battery voltage $U_{real}$ measured by the BMS.

Figure 10:
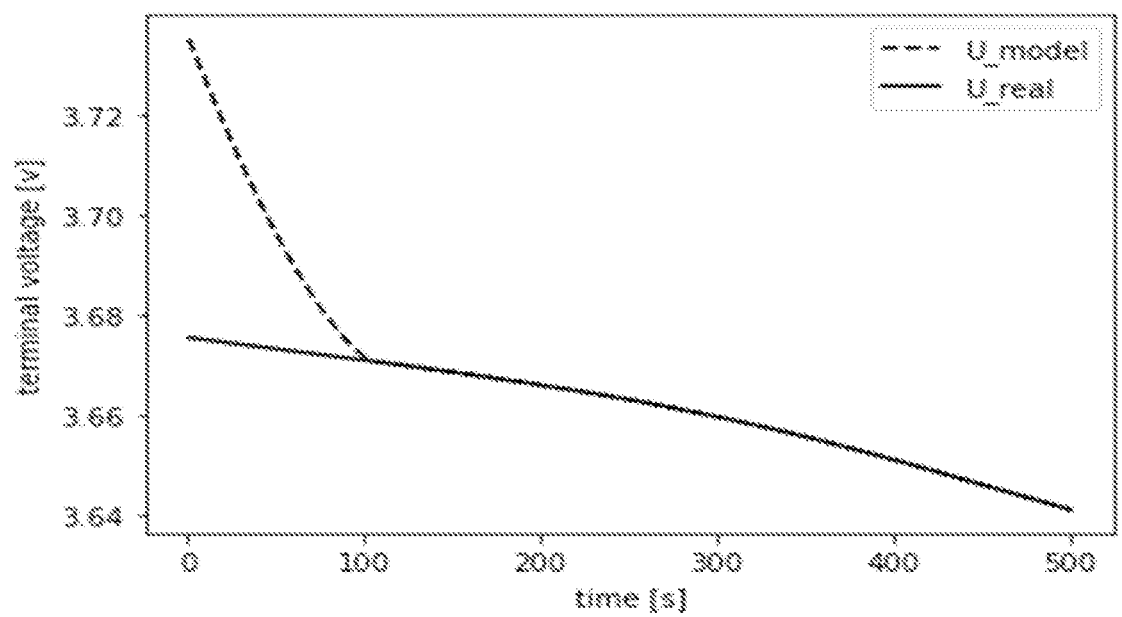
FIG. 10 is a change curve of the output voltage and the measured voltage during the correction process of the P2D model under the stable working conditions, according to one embodiment of the invention.

Step 2.5: performing step 2.4 several times until the error between the voltage $U_{model}$ calculated by the electrochemical model and the measured voltage $U_{real}$ is controlled within the threshold. The curve of U_model (i.e., $U_{model}$) and U_real (i.e., $U_{real}$) during the correction process is shown in FIG. 10. It can be seen that at about 105 seconds, the error is controlled within the threshold (=5 mV), and the concentration distribution of the electrochemical model is completed.

Calculating the average concentration $C_{mean}$ of solid-phase lithium ions at this time, and then calculating the current SOC value of the battery based on $C_{mean}$.

Figure 11:
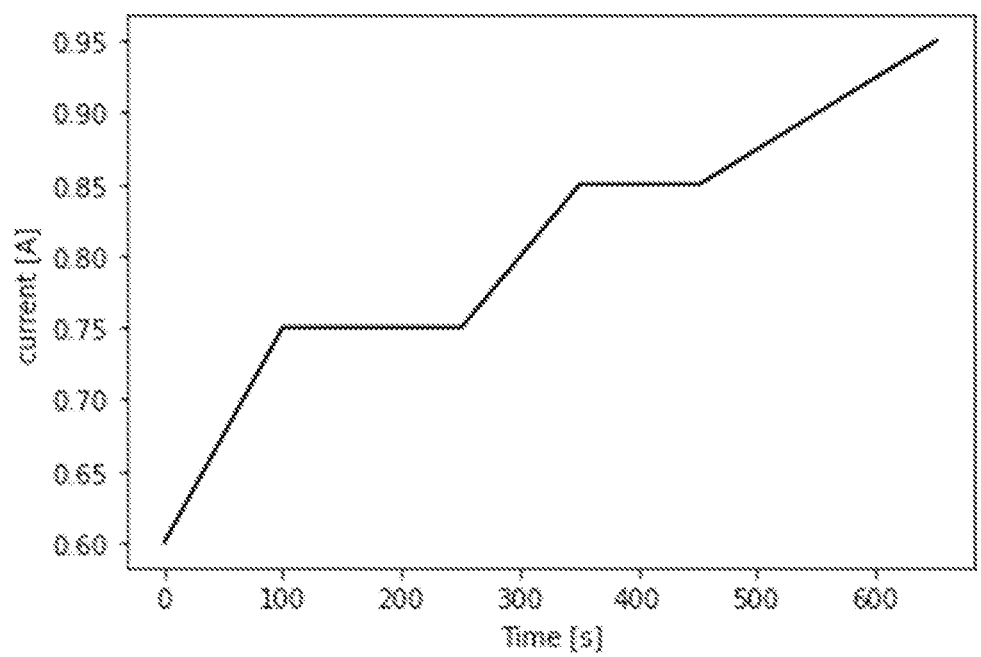
FIG. 11 shows current changes under dynamic working conditions, according to one embodiment of the invention.
Figure 12:
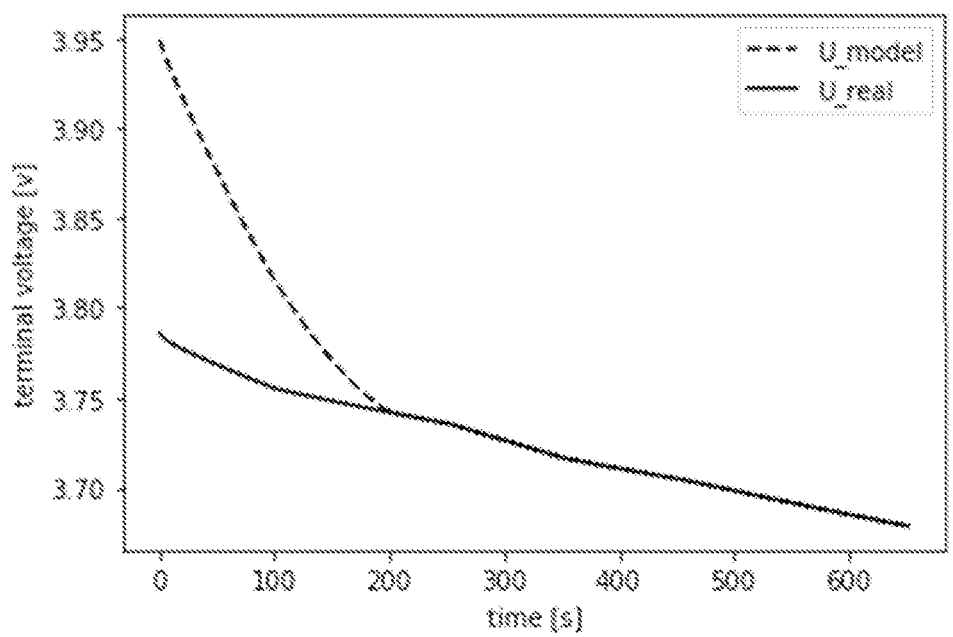
FIG. 12 is a change curve of the output voltage and the measured voltage during the correction process under the dynamic working conditions, according to one embodiment of the invention.

By using the P2D model, the SOC of the battery is estimated under dynamic conditions. The current under the dynamic conditions is shown in FIG. 11, and the terminal voltage during the process of obtaining the SOC is shown in FIG. 12.

Clearly, since the P2D model can more accurately simulate lithium batteries, the P2D model and this method can also accurately estimate the SOC value under dynamic conditions and high currents, and has wider adaptability.

In the exemplary embodiments, by establishing an electrochemical model for the battery, and according to the difference between the output voltage value of the electrochemical model and the actual voltage value under certain working conditions, the distribution of the lithium ion concentrations is corrected until the voltage error is controlled within the threshold value, so as to complete the correction of the electrochemical model. Then recalculating the SOC of the battery based on the corrected distribution of the lithium ion concentrations. According to the invention, there is no requirements to the accuracy of the initial value of the SOC in the invented method, the correction of the battery SOC value can be completed in a short period of working conditions. The correction can also be online correction in real-time, or a correction using online charging/discharging of the battery for the SOC correction. It is also possible to complete the correction of the SOC value after a short charge and discharge experiment on a regular basis.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A method for estimating a state of charge (SOC) of a battery based on an electrochemical model, comprising:
   building the electrochemical model for the battery;
   setting an initial value of the current SOC of the battery, and determining an initial distribution of solid-phase lithium ion concentrations in the electrochemical model according to the initial value of the SOC;

performing a charge/discharge test on the battery, and after a first time interval, collecting a measured voltage and a measured current of the battery;

calculating an output voltage and a distribution of the solid-phase lithium ion concentrations of the electrochemical model at a current acquisition time, based on the measured current and the initial distribution of the solid-phase lithium ion concentrations;

when a voltage difference between the output voltage and the measured voltage is within the preset range, calculating the average concentration of the solid-phase lithium ions of the electrochemical model based on the distribution of the solid-phase lithium ion concentrations at the current acquisition time, and calculating the current SOC value of the battery according to the average concentration;

when the voltage difference between the output voltage and the measured voltage exceeds the preset range, adjusting the distribution of the solid-phase lithium ion concentrations at the current acquisition time based on the voltage difference between the output voltage and the measured voltage, and the relationship between the predicted positive/negative electrode open circuit potential (OCP) and the solid-phase surface lithium ion concentration;

obtaining the measured voltage and the measured current of the battery at a next acquisition time;

calculating the output voltage and the distribution of the solid-phase lithium ion concentrations of the electrochemical model at the next acquisition time according to the measured current at the next acquisition time and the adjusted distribution of the solid-phase lithium ion concentration;

when a voltage difference between the output voltage at the next acquisition time and the measured voltage at the next acquisition time is within the preset range, calculating the average concentration of the solid-phase lithium ions of the electrochemical model according to the distribution of the solid-phase lithium ion concentration at the next acquisition time, and calculating the current SOC value of the battery according to the average concentration;

wherein said adjusting the distribution of the solid-phase lithium ion concentrations at the current acquisition time based on the voltage difference between the output voltage and the measured voltage, and the relationship between the predicted positive/negative electrode open circuit potential (OCP) and the solid-phase surface lithium ion concentration comprises:

selecting a positive electrode or a negative electrode as the first electrode;

obtaining the surface lithium ion concentration of the first electrode of the electrochemical model at the current acquisition time, which is recorded as the first surface lithium ion concentration;

obtaining the open circuit potential of the first electrode at the current acquisition time corresponding to the concentration of lithium ions on the first surface, according to the relationship between the open circuit potential of the first electrode and the lithium ion concentration on the solid phase surface;

obtaining the adjusted open circuit potential of the first electrode according to the voltage difference between the output voltage and the measured voltage, and the open circuit potential of the first electrode at the current acquisition time;

obtaining the concentration of lithium ions on the surface corresponding to the adjusted open circuit potential of the first electrode according to the relationship between the open circuit potential of the first electrode and the concentration of lithium ions on the solid phase surface, and recording it as the second surface lithium ion concentration;

obtaining the maximum surface lithium ion concentration difference according to the concentration difference between the first surface lithium ion concentration and the second surface lithium ion concentration; and adjusting the distribution of the solid-phase lithium ion concentration at the current acquisition time according to the maximum surface lithium ion concentration difference.

2. The method according to claim 1, wherein said adjusting the distribution of the solid-phase lithium ion concentration at the current acquisition time according to the maximum surface lithium ion concentration difference comprises:

linearly correcting the distribution of the lithium ion concentrations of the first electrode particle along the radial direction, wherein the correction amount of the lithium ion concentration of the first electrode particle at the radial distance satisfies the formula of $$\Delta c_r = \frac{r}{R} \times \alpha k_{\Delta U}$$

wherein R is the radius of the particles in the electrode, r is the radial distance of the particles in the electrode, $k_{\Delta U}$ is the maximum surface lithium ion concentration difference, a is the correction coefficient; and determining the correction amount of the lithium ion concentration of the another electrode particle according to the conservation principle of the total amount of lithium ions inside the positive and negative electrode particles and the correction amount of the lithium ion concentration of the first electrode particle.

3. The method according to claim 1, wherein said calculating the current SOC value of the battery is according to the formula of:

$$SOC = \frac{c_{mean} - c_{SOC=0\%}}{c_{SOC=100\%} - c_{SOC=0\%}}$$

wherein $C_{mean}$ is the average concentration of the solid-phase lithium ions, $C_{SOC=0\%}$ is the solid-phase lithium ion concentration when the SOC is equal to 0, and $C_{SOC=100\%}$ is the solid-phase lithium ion concentration when the SOC is equal to 1.

4. The method according to claim 1, wherein the electrochemical model is a single-particle model class, said calculating the average concentration of the solid-phase lithium ions is according to the formula of:

$$c_{mean} = \frac{\int_0^R \frac{4}{3}\pi c_r r^2 dr}{\frac{4}{3}\pi R^3}$$

wherein R is the radius of the particles in the electrode, r is the radial distance of the particles in the electrode, and $C_r$ is the solid-phase lithium ion concentration of the particles at the radial distance r.

5. The method according to claim 1, wherein the electrochemical model is a quasi-two-dimensional model class, said calculating the average concentration of the solid-phase lithium ions is according to the following formula:

$$c_{mean} = \frac{1}{N} \frac{\sum_{x=1}^{N} \int_0^R \frac{4}{3}\pi c_{x,r} r^2 dr}{\frac{4}{3}\pi R^3}$$

wherein R is the radius of the particles in the electrode, r is the radial distance of the particles in the electrode, N is the number of discrete regions set along the thickness direction of the electrode, $C_{x,r}$ is the solid-phase lithium ion concentrations of the particles in the x-th discrete region at the radial distance r.

6. The method according to claim 1, wherein the electrochemical model is one of a single-particle model, an extended model based on a single-particle model, a quasi-two-dimensional model, and an extended model based on a quasi-two-dimensional model.

7. A device for estimating a state of charge (SOC) of a battery based on an electrochemical model, comprising:
  a modeling module, configured to build the electrochemical model of the battery;
  an initial setting module, configured to set the initial value of the current state of charge SOC of the battery, and determine the initial distribution of the solid-phase lithium ion concentrations in the electrochemical model according to the initial value of the SOC;
  an acquisition module, configured to perform charging/discharging test of the battery, and collect the measured voltage and the measured current of the battery after the first time interval;
  a model calculation module, configured to calculate the output voltage and distribution of the solid-phase lithium ion concentration of the electrochemical model at the current acquisition time according to the measured current at the current acquisition time and the initial distribution of the solid-phase lithium ion concentrations;
  an SOC calculation module, configured to calculate the average concentration of solid-phase lithium ions in the electrochemical model according to the distribution of solid-phase lithium ion concentration at the current acquisition time when the voltage difference between the output voltage and the measured voltage is within a preset range, and then calculate the current SOC value of the battery based on the average concentration; and
  a concentration distribution correction module, configured to, when the voltage difference between the output voltage at the current acquisition time and the measured voltage exceeds the preset range, adjust the distribution of the solid-phase lithium ion concentrations at the current acquisition time, based on the voltage difference between the output voltage and the measured voltage, and the relationship between the predicted positive/negative electrode open circuit potential (OCP) and the solid-phase surface lithium ion concentration;
  wherein the acquisition module is further configured to obtain the measured voltage and measured current of the battery at the next acquisition time;
  wherein the model calculation module is further configured to calculate the output voltage and distribution of the solid-phase lithium ion concentration of the electrochemical model at the next acquisition time according to the measured current at the next acquisition time and the adjusted distribution of the solid-phase lithium ion concentration;
  wherein the SOC calculation module is further configured to: when a voltage difference between the output voltage at the next acquisition time and the measured voltage at the next acquisition time is within the preset range, calculating the average concentration of the solid-phase lithium ions of the electrochemical model according to the distribution of the solid-phase lithium ion concentration at the next acquisition time, and calculating the current SOC value of the battery according to the average concentration;
  wherein the concentration distribution correction module comprises:
  a maximum concentration difference calculation unit, configured to a positive electrode or a negative electrode as the first electrode; obtain the surface lithium ion concentration of the first electrode of the electrochemical model at the current acquisition time, which is recorded as the first surface lithium ion concentration; obtain the open circuit potential of the first electrode at the current acquisition time corresponding to the concentration of lithium ions on the first surface, according to the relationship between the open circuit potential of the first electrode and the lithium ion concentration on the solid phase surface; obtain the adjusted open circuit potential of the first electrode according to the voltage difference between the output voltage and the measured voltage, and the open circuit potential of the first electrode at the current acquisition time; obtain the concentration of lithium ions on the surface corresponding to the adjusted open circuit potential of the first electrode according to the relationship between the open circuit potential of the first electrode and the concentration of lithium ions on the solid phase surface, and recording it as the second surface lithium ion concentration; and obtaining the maximum surface lithium ion concentration difference according to the concentration difference between the first surface lithium ion concentration and the second surface lithium ion concentration; and
  a correction unit, configured to adjust the distribution of the solid-phase lithium ion concentration at the current acquisition time according to the maximum surface lithium ion concentration difference.

* * * * *